United States Patent [19]

Krause

[11] Patent Number: 4,812,928

[45] Date of Patent: Mar. 14, 1989

[54] STEPPER MOTOR DATA RECOVERY METHOD USING A MAGNETIC HYSTERESIS BASED STEPPING ALGORITHM

[75] Inventor: James N. Krause, Morgan Hill, Calif.

[73] Assignee: Seagate Technology, Inc., Scotts Valley, Calif.

[21] Appl. No.: 85,117

[22] Filed: Aug. 14, 1987

[51] Int. Cl.$^4$ .......................... G11B 5/55; G11B 5/56
[52] U.S. Cl. .................. 360/78.08; 360/75; 360/53; 360/78.13
[58] Field of Search .............. 360/75, 77, 78, 25, 360/31, 53, 105–107, 109; 369/32, 33, 41; 318/685, 696

[56] References Cited

U.S. PATENT DOCUMENTS

| | | | |
|---|---|---|---|
| Re. 31,166 | 3/1983 | Korda | 360/53 |
| 3,956,766 | 5/1976 | Hanson et al. | 360/78 |
| 4,516,165 | 5/1985 | Cunningham et al. | 360/53 |

FOREIGN PATENT DOCUMENTS 61-42579  6/1986  Japan .................................. 360/77

Primary Examiner—Alan Faber
Assistant Examiner—Steven R. Garland
Attorney, Agent, or Firm—Flehr, Hohbach, Test, Albritton & Herbert

[57] ABSTRACT

A method and system using the magnetic hysteresis of a stepping motor to offset the position of a transducer relative to a disk target track during data recovery. The data recovery is accomplished by energizing selected phases of the stepping motor while moving to the target track and then de-energizing a selected phase during the final movement to the target track which results in the transducer being offset from the target track so that illegible information can be recovered.

6 Claims, 4 Drawing Sheets

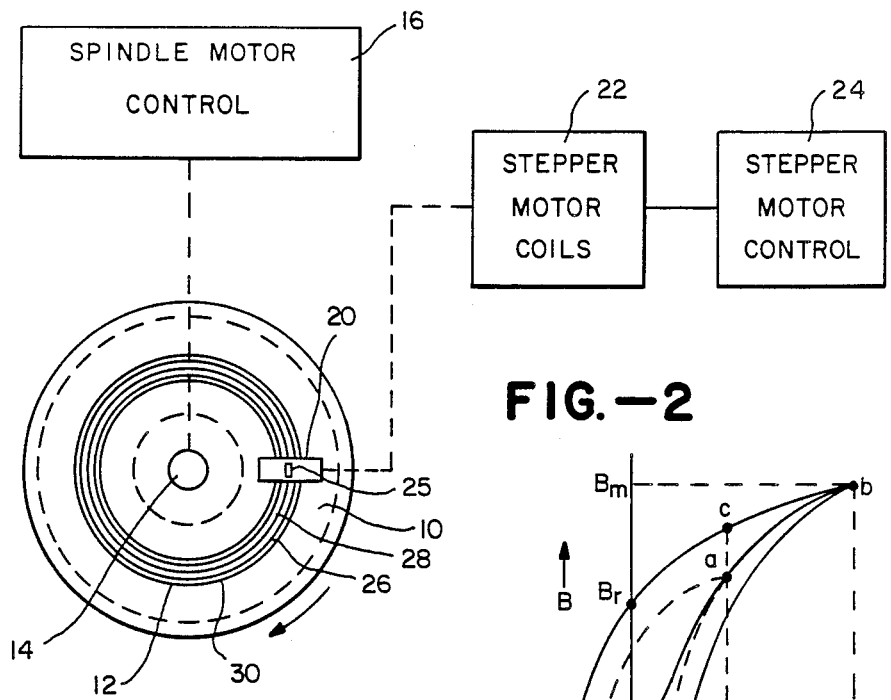
FIG.—2
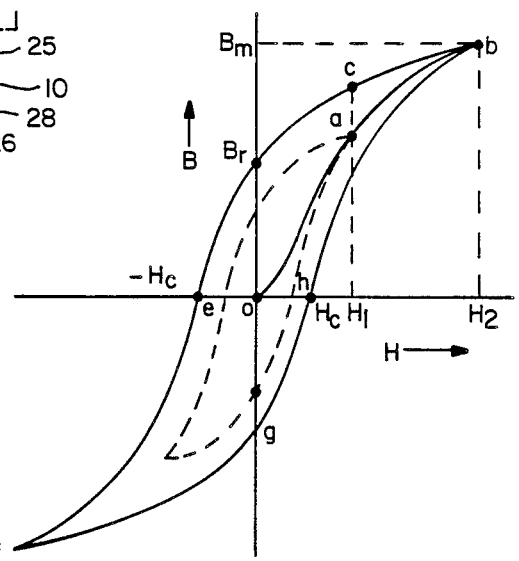
FIG.—1
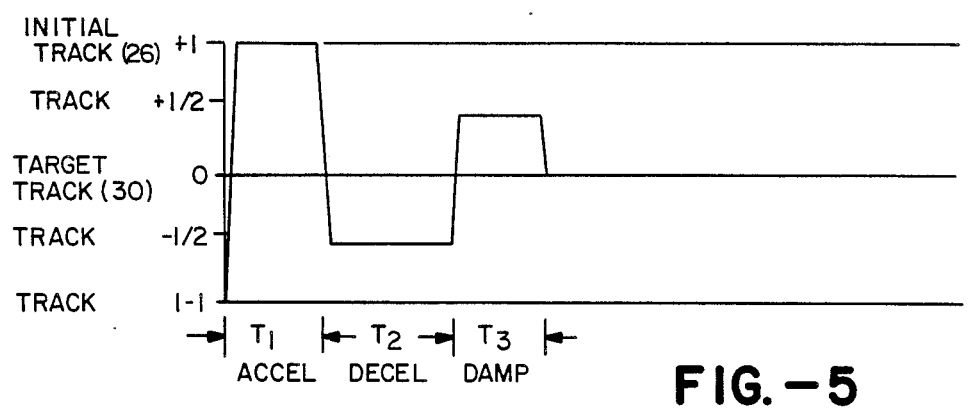
FIG.—5

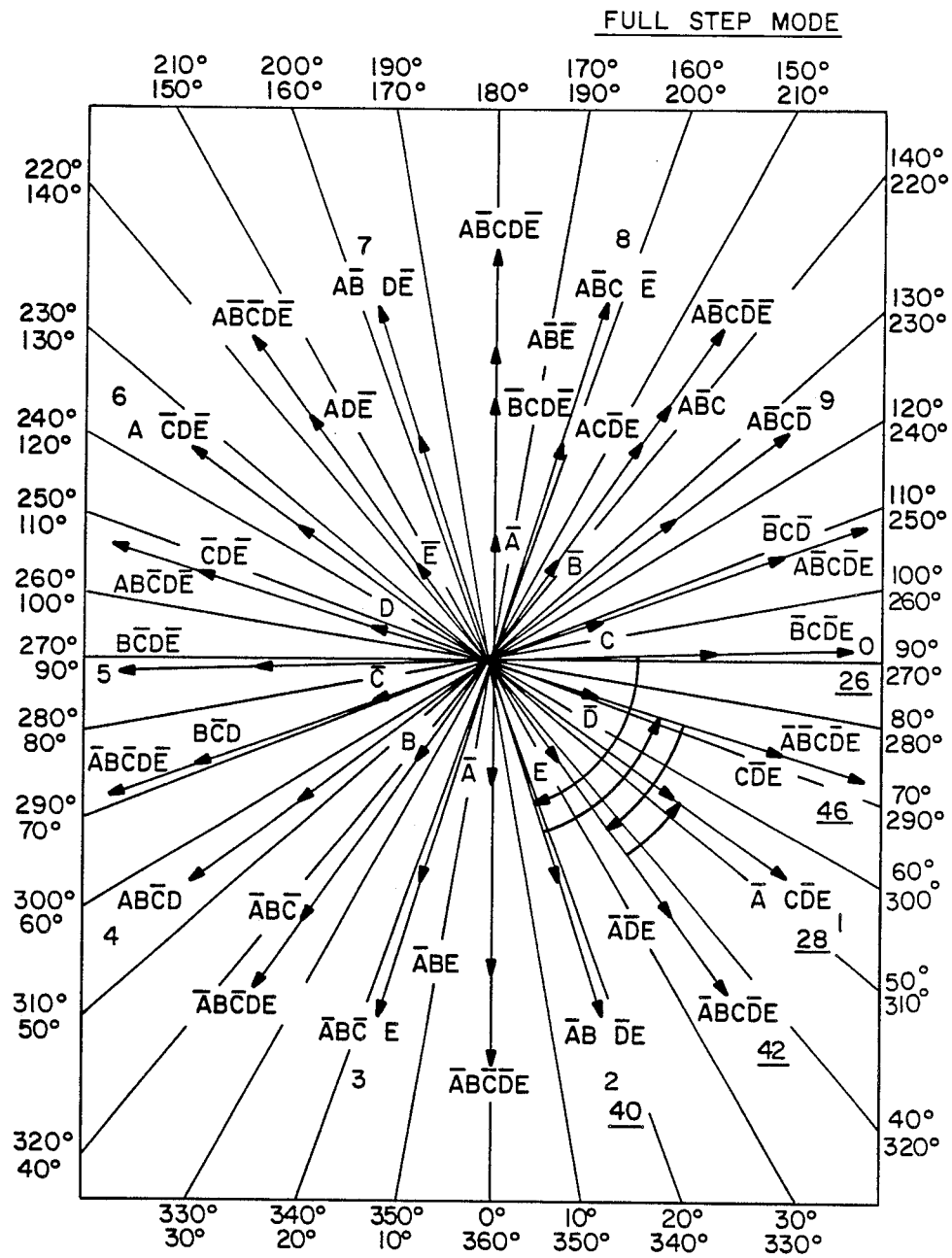
FIG.—4A

STEPPER MOTOR DATA RECOVERY METHOD USING A MAGNETIC HYSTERESIS BASED STEPPING ALGORITHM

This invention relates generally to data recording systems, and more particularly to means for using magnetic hysteresis for positioning movable heads to recover data when data integrity has been lost in moving medium recording systems.

BACKGROUND OF THE INVENTION

Rotating disc memory storage devices are used in conjunction with digital computers to magnetically store digital information on a non-volatile basis. A typical device of this type includes a spindle rotated by a drive motor mechanism, one or more recording discs attached to the spindle, either permanently or removably, for rotation therewith at a relatively precise constant speed, and an electromechanical read/write assembly for enabling information to be written onto and read from the disc recording surfaces. Each read/write assembly includes a number of transducers for reading and writing data magnetically from and to the individual disc recording surfaces, and a transducer motion translation mechanism, typically operated by a stepper motor, to effect radial motion of the transducers across the recording surface of each disc. The stepper motor is typically driven by control circuitry that receives electrical position signals in digital form from the associated computer, and converts this position information into mechanical motion of the transducer heads.

Each annular recording surface of a disc is usually arranged in the form of concentric circular tracks divided in the circumferential direction into track sectors, in order to enable access locations to be accurately specified by the associated computer for rapid and accurate information storage and retrieval.

Recent trends in the development of rotating disc memory storage devices have been toward reduction in the physical size of the system without sacrificing, and in many cases increasing, the storage capacity of each disc. These trends have been especially evident in disc drives designed for use in small business computers and personal computers. Such disc drives employ 5¼" or 3½" fixed rigid discs, removable flexible (floppy) discs or a combination of both. Due to the relatively small surface area available for information storage on such discs, many efforts have been made to maximize the amount of information that can be accurately stored on such discs. These efforts have included a wide variety of specially designed recording techniques, read/write transducers with increasingly narrow heads (to reduce trace width) and disc recording layers with improved magnetic recording properties and finer surface smoothness.

To obtain the maximum storage capacity for a fixed cost, it is desirable that each disc contain the maximum number of bits and tracks per inch. As the track density increases, however, it becomes increasingly difficult to repeatably precisely position the heads. Therefore, it happens that from time to data integrity is lost, by virtue of the fact that the head was not properly positioned over the track during the writing operation, or that it is not now precisely positioned over the track for the read operation. Once such data integrity has been lost in a stepper motor position control system, a method of "off-track" data recovery must be employed.

SUMMARY OF THE INVENTION

It is an objective of this invention to provide a method for positioning the heads in a moving medium recording system to attempt to recover data when data integrity has been lost.

More particularly, it is an objective here to provide a method of using a particular step sequence or algorithm that will position the data transducer in a data recovery position a predetermined distance on each side of the original track or head position, so that a repeatable mode of data recovery can be carried out.

A further objective is to provide in a stepper motor controlled disc drive positioning system a method of creating an intentional positioning error on either side of a desired track position using step motor hysteresis or magnetic memory.

A related objective here is to provide a positioning system that creates an intentional positioning error on either side of a desired track position without any closed loop feedback control or additional electronic or mechanical hardware.

This invention makes use of a phenomenon called magnetic hysteresis which in the past has solely been thought of as contributing to disc drive transducer positioning error in a stepper motor system.

Hysteresis is the lag of magnetization behind magnetizing force as the magnetic condition of a ferromagnetic material is changed. The phenomenon can be explained with reference to FIG. 1 of this application. When a ferromagnetic sample that is initially demagnetized is subjected to a continuously increasing magnetizing force H, the relation between force H and flux density B is shown by the normal magnetization curve Oab of the Figure. This is the magnetization force.

The curve illustrates the phenomenon that occurs when a coil of a stepper motor is energized to cause movement of the stepper motor through one or more steps to change the position of a transducer head. The point a indicates the magnetic condition as the increasing magnetic intensity reaches $H_1$. If magnetizing force H is increased to a maximum value $H_2$, then decreased again to $H_1$, the decreasing flux density does not follow the path of increase, but decreases at a rate less than that at which it rose. This lag in the change of flux density b behind the change of magnetizing force H is called "hysteresis." Even if the value of magnetizing force H is further reduced from $H_1$ to zero, flux density b is not reduced to zero but to a vale $B_r$.

Applying this concept to the energized coils of a stepper motor, a coil, even when de-energized, retains some residual magnetization. Normally several but not all phases of a stepper motor are energized to select a given position for the motor. The residual magnetization of a coil which would not normally be energized in positioning a transducer over a track will result in positioning of the transducer a small, determinable distance away from the desired track.

Briefly, in accordance with this invention, the magnetic hysteresis or magnetic memory that exists in a coil of a stepper motor in making a single track step is used to implement an off-track data recovery mode. More particularly, in positioning a transducer over a desired track, means are provided for implementing the following method.

First, a seek is conducted to a target track. The data on that track is read and checked for errors. In the event more data errors are found than an established limit value, the off-track data recovery method of the invention is initiated. The method composes intentionally defining a positioning error on either side of a desired track position using step motor hysteresis. Specifically, first a seek away from the desired track to the next track forward toward the disc center is carried out. Then a seek back toward the desired track is conducted, using a sequence of phase energization which will create a limited stepper motor hysteresis in one coil to create a displacement vector, causing a limited off-track positioning of the transducer. The data is then read at this off-track position. Then a seek is carried out one track in the reverse direction, that is, a track toward the outer circumference of the disc. Again, a seek back toward the desired track is carried out, using a sequence of phase energization which will result in a magnetic hysteresis being created in a single coil to establish a magnetic vector which will cause limited mistracking. Again, the data is read, this time at the mistrack position on the opposite side of the desired track from the first reading. As a final step, the transducer is again returned to the target track.

This sequence will allow data recovery on both sides of any desired track, and will provide data recovery of misregistered data from 10–20% off-track center line from the target track.

The method by which the intentional off-track is created uses a sequence of energization of the phases of a motor such that one phase which is energized to position the transducer one track away from the target track is not reversed in phase in moving the transducer back toward the target track. Due to the phenomenon of magnetic hysteresis, this non-reversed phase will thereby retain some magnetic memory, causing the creation of a positioning vector that will position the transducer an intentional error distance of 10–20% of the track-to-track spacing away from the desired or target track.

BRIEF DESCRIPTION OF THE DRAWINGS

The features and advantages of this invention will be better understood by referring to the following description given with reference to the accompanying drawings, in which like reference numbers refer to like parts, and in which:

FIG. 1 is a curve illustrating the magnetic hysteresis phenomenon;

FIG. 2 is a block diagram illustrating several basic elments of a disc drive important to understanding the invention;

FIGS. 4A and 4B are polar diagrams of the steps followed to carry out the forward step sequence and reverse step sequence and seeking from an initial track to an off-track position relative to a target track; and FIG. 5 is a timing diagram of the sequence followed in seeking from an initial track to an off-track position relative to a target track in a reverse seeking mode.

DESCRIPTION OF A PREFERRED EMBODIMENT

Figure 3:
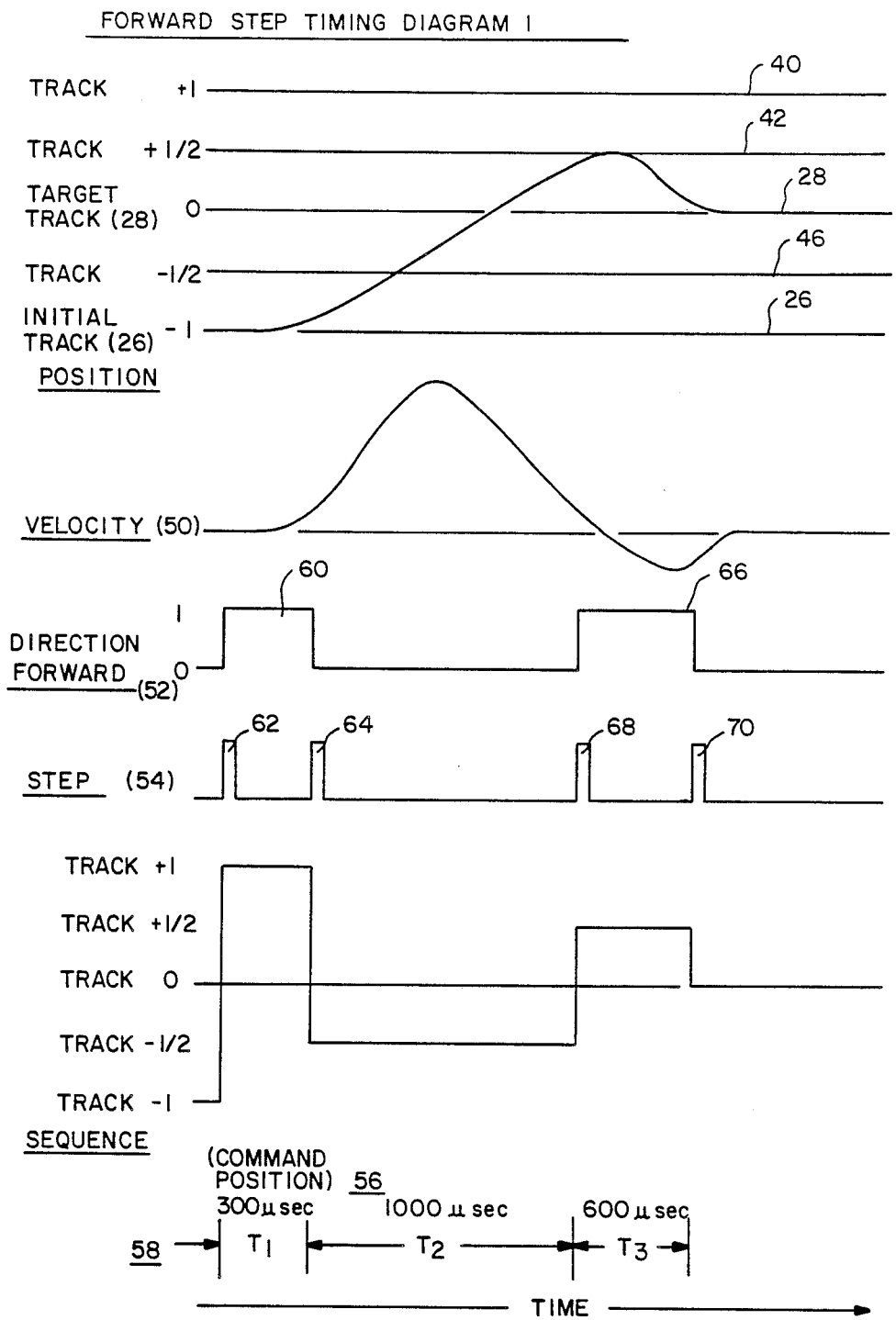
FIG. 3 is a timing diagram illustrating the steps used to achieve the magnetic hysteresis mispositioning vector that results in the off-track data reading position.

Referring to FIG. 2, a data storage system incorporating this invention is shown in schematic form, including a data surface 10 on which data is stored on a plurality of concentric tracks 12. The shaft on which the disc or discs are mounted is rotated at a constant speed by a spindle motor not shown controlled by a spindle motor control 16.

To access data on any one of the tracks 12, it is first necessary to accurately position the gap of the transducer 20 accurately over the selected track. As is well known in this technology, this positioning is achieved by selective energization of stepper motor coils 22 through a stepper motor controller 23. For further details of the actual structure of the disc drive in which this invention could be used, reference is made to U.S. application Ser. No. 914,690 filed Oct. 2, 1986, entitled ROTARY ACTUATOR; for a detailed description of a motor drive controller, reference is made to Ser. No. 929,559 filed Nov. 10, 1986, entitled COMBINED SERVO SYSTEM AND MOTOR CONTROL DRIVE and assigned to the Assignee of this invention. Both are incorporated herein by reference. For purposes of referring to the other drawings in this application, it can be assumed that the transducer is of standard construction and contains a gap indicated at 24 in FIG. 2, shown aligned with a target track 26. A method and apparatus for accurately positioning the transducer gap 24 over target track 26 is described in an application entitled STEPPER MOTOR MAGNETIC HYSTERESIS CORRECTION USING A PARTICULAR STEPPING SEQUENCE OR ALGORITHM, invented by J. Krause, Ser. No. 085,118, filed Aug. 14, 1987, now U.S. Pat. No. 4,768,115. When data has been read, it is typically compared to an established standard so that the presence of errors can be detected. When an excessive number of errors is found, the off-track data recovery sequence of this invention is implemented.

Basically, the off-track data recovery method herein would proceed as follows, beginning with the head gap 24 aligned with the target track 26.

The stepper motor control 23 first energizes the phases of the motor to move the transducer one track forward, i.e., toward the center of the disc to an initial track 28. Then a sequence, described below, comprising a sequence of steps of the stepper motor is carried out, resulting in the transducer being positioned in an off-track position relative to the target track. Data recovery is now attempted with the transducer maintained in this position. Following this, the transducer is now moved one track in the reverse direction, that is, to the next track 30 away from the center of the disc. A sequence of steps is now carried out that will result in the transducer being moved toward the target track 26 but landing with the mistrack error in the forward direction relative to the target track 26. Date reading is now carried out in this position. Following this, the transducer 20 is again returned to the target track 26. This sequence provides for a data search on both sides of any target track, and will allow for data recovery of misregistered data from 10–20% off target track centerline.

Considering specifically the sequence to be followed in what will be termed a forward seek data recovery, the sequence begins with the transducer positioned over track +1 or initial track 28, that is, one track toward the center of the disc from the target track. It will be seen from reference to FIG. 3 that as a first step or power step, which occurs at time T1, the step motor is accelerated in an effective two-step lead; that is, as though to drive the transducer from initial track 28 to a track (30), one track beyond the target track. The next step, carried out at time period T2 is a braking step to start the decelerate portion of the seek. For this step, phases of the motor are energized as though to drive the transducer to a track position 46 half way between the initial track 28 and the target track 26. Finally, a seek is carried out one-half step from the half-track position 46 toward the target track 26. This step at the end of time t2 will leave the transducer positioned from 10-20% negative off-track relative to the target track 26. This back phase damping method will leave the step motor position on the negative side of the target track for off-track data recovery. The sequence of phases to be energized is illustrated in FIG. 4A. As shown in this polar diagram, when the transducer is positioned at the track 28, phases $B\overline{CD}E$ are energized. To carry out the power step for acceleration of the transducer toward the target track 26, phases $\overline{A}B\overline{DE}$ are energized. Finally, to carry out the damping step which will leave the step motor positioned on the negative side of the target track, phases $\overline{AB}D$ are energized. It will be noted that although phase B is not energized in the final position of the motor, it is energized at the damping step, and no reversal of energization of this phase occurs. Therefore, magnetic hysteresis or magnetic memory is created in this phase of the motor, resulting in what would ordinarily be considered a magnetic error vector and a 10-20% off-track relative to the target track. However, according to this invention, since it has already been determined that data cannot be correctly read on the target track, in this negative off-track position a data read is now carried out.

Figure 4B:
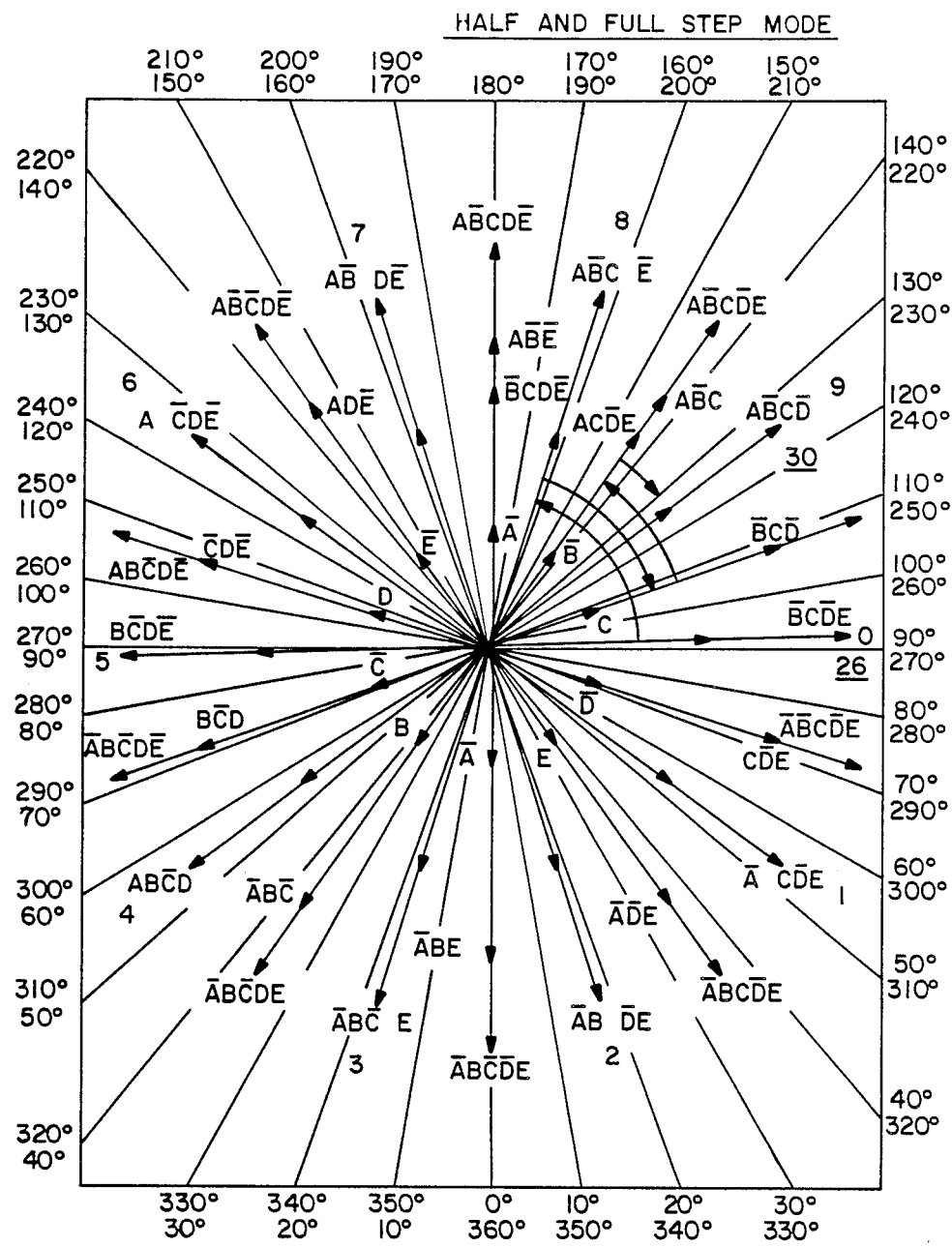

The sequence of control pulses necessary to carry out this positioning are shown in FIG. 3 at the line labelled, "direction forward 52" and "step 54." These lines illustrate roughly the time duration, and timing of control pulses relative to the change in energization of the phases of the motor in order to carry out this positioning sequence. Specifically, the first step, the accelerate step, is carried out with a direction forward signal being applied by the stepper motor control 23, while a step pulse 62 is transmitted. With the end of the direction forward signal, a second step pulse 64 is sent, while the phases to be energized are changed to those to direct the movement of the transducer back toward the half-track position 46. The direction forward signal 66 is then restored, simultaneously with transmission of a third step pulse 68, and change of the phases to be energized to those to move the motor to the negative off-track position where the data read will be carried out. This results in the final positioning of the transducer for reading of the data.

The net result of the sequence of control pulses and energization of selected phases of the motor is that balance between the energized phases to erase magnetic memory therein has not occurred. The result of this sequence is an error due to the magnetic memory phase $\overline{B}$, which is an undesired phase in the final positioning in the motor and transducer. The resulting error vector leaves the step motor position with a net negative off-track consistent with the motor's hysteresis profile. Therefore, a 10-20% intentionally induced error in positioning of the transducer relative to the target track 26 can be reliably expected.

As the final phase of data recovery, an off-track reverse seek is carried out, beginning from a track +1; that is, the initial track 30 is now one track toward the center of the disc from the target track 26. Referring to polar diagram 4b, and timing diagram FIG. 5, when the motor is positioning the transducer at track 30, phases $\overline{A}B\overline{DE}$ are energized. At initial step pulse 62, the phase sequence is changed to energizes phases $B\overline{CD}E$. Of course, the direction forward line is not high at this time. At the end of time period t1, the direction foward line goes high, and the step pulse 64 is transmitted while phases $\overline{A}BC\overline{DE}$ are energized. Finally, at the end of this braking step the direction forward line again goes low, the third step pulse 68 is transmitted, and the energized phases are switched to $\overline{AC}\overline{DE}$. This back phase damping method leaves the step motor positioned on the positive side of the target track 26, that is, toward the half-track position 42. Data recovery is now attempted in this positive off-track position.

Again, elimination of magnetic hysteresis in the stepper motor sequence has intentionally been avoided. Balancing between the phases to erase magnetic memory has not occurred. The result of this sequence is an error from the magnetic memory of the phase B, an undesired phase, in final positioning of the motor. This error vector will leave the step motor position with a net positive offtrack consistent with the motor's hysteresis profile. That is, a 10-20% error positioning of the transducer relative to the track 26 toward the half-track position 42 can be reliably expected. Data recovery is now attempted using this second, positive off-track error.

In summary, by using the method and apparatus described herein, both positive and negative sides of a target step position are reached by using a step motor's inherent hysteresis error. This scheme will yield two data recovery steps, one on each side of the target track centerline, which should be sufficient for data recovery in disc drive systems.

Modifications of this method and apparatus may become apparent to a person of skill in the art who follows the above invention disclosure. Therefore, the scope of this invention is to be limited only by the following claims.

What is claimed is:

1. A computer disc drive system comprising at least one disc having a plurality of concentric data tracks thereon, means for rotatably supporting said disc, means comprising an actuator for supporting a transducer over said disc for reading and writing digital information on said disc tracks, said system having positioning means for selectively positioning said transducer in alignment with one of said data tracks as a target track on said rotating disc for reading and writing data, open loop position means coupled to said actuator comprising a multi-phase stepper motor for moving said actuator and thereby said transducer from or over an initial track spaced from said target track to said target track, and data recovery means for energizing the phases of said motor in a sequence that will establish a magnetic memory error in at least one of said phases in moving said transducer from said initial track toward a data recovery position displaced from said alignment with said target track, wherein data recovery can be effected, said data recovery means comprising means for selectively energizing a plurality of said phases of said motor to move said transducer to said initial track and for de-energizing one of said phases as said transducer is moved to said target track to produce said memory error, said de-energized phase acting as a memory error phase, power means for reversing the energization of said memory error phase which is to be de-energized at said target track, and braking means for re-energizing said memory error phase while slowing the movement of the transducer toward said target track, wherein the magnetic memory of the de-energized memory error phase at the target track is established, causing said transducer to off-track relative to said alignment with the target track at the data recovery position.

2. A computer disc drive system as in claim 1 wherein each of said power means and braking means comprise means for energizing the phase to be de-energized at the data recovery position.

3. In a computer disc drive system comprising at least one disc having a plurality data tracks thereon, means for rotatably supporting said disc, means comprising an actuator for supporting a transducer over said disc for reading and writing digital information on said disc tracks, said system having positioning means for selectively positioning said transducer in alignment with a target track of said data tracks on said rotating disc, and open loop positioning means coupled to said actuator including a multi-phase stepper motor for moving said actuator and thereby said transducer from or over an initial track to said target track, a method of data recovery when an excessive number of errors are read from said target track comprising the steps of energizing phases of said motor for moving said transducer from said target track to an initial track spaced from said target track, wherein selected phases of said multiphase motor are energized to move said transducer to said initial track displaced from said target track and then a seek back toward said target track is conducted, and at least one phase of said selected phases used to reach said initial track is de-energized at act as a memory phase at said target track, the sequence of energization of said phases being selected to establish a magnetic memory in said memory phase, wherein a data recovery position for said transducer governed by the motor's hysteresis profile is established adjacent to said target tracks.

4. A method as in claim 3 including the steps of detecting an excessive error level in data recovery at said target track, an initialization step for moving said transducer from said target track to said initial track radially spaced from said target track, and thereafter moving said transducer to said data recovery position adjacent to said target track, and reading data at said data recovery position.

5. A method as in claim 4 wherein said initialization step movement for moving said transducer from said target track to an initial track is performed twice to move said transducer both to an initial track spaced radially outward from said target track and an initial track spaced radially inward from said target track, each said initialization step being followed by movement to a respective data recovery position.

6. A method as in claim 4 further including a first acceleration step for accelerating said transducer from said initial track toward a track beyond said target track, and a braking step for slowing said transducer to stop at a radial position slightly beyond the data track relative to the target track.

* * * * *